(12) United States Patent
Schlanger

(10) Patent No.: US 11,973,365 B2
(45) Date of Patent: Apr. 30, 2024

(54) ULTRA-EFFICIENT BATTERY INTEGRATED INVERTER/CHARGER

(71) Applicant: William Jeffrey Schlanger, Palm Springs, CA (US)

(72) Inventor: William Jeffrey Schlanger, Palm Springs, CA (US)

( * ) Notice: Subject to any disclaimer, the term of this patent is extended or adjusted under 35 U.S.C. 154(b) by 0 days.

(21) Appl. No.: 18/236,971

(22) Filed: Aug. 23, 2023

(65) Prior Publication Data

US 2023/0396092 A1     Dec. 7, 2023

Related U.S. Application Data

(63) Continuation of application No. PCT/US2023/011684, filed on Jan. 27, 2023.

(60) Provisional application No. 63/303,932, filed on Jan. 27, 2022.

(51) Int. Cl.
*H02J 7/06*       (2006.01)
*H02J 7/02*       (2016.01)

(52) U.S. Cl.
CPC ........ *H02J 7/06* (2013.01); *H02J 7/02* (2013.01); *H02J 2207/20* (2020.01)

(58) Field of Classification Search
CPC .................................................... H02J 7/06
USPC ...................................................... 320/116
See application file for complete search history.

(56) References Cited

U.S. PATENT DOCUMENTS

| | | | |
|---|---|---|---|
| 11,444,550 B1* | 9/2022 | Jelinek | H02J 7/35 |
| 2007/0034246 A1* | 2/2007 | Nakata | H02J 3/466 |
| | | | 429/432 |
| 2014/0312828 A1 | 10/2014 | Vo et al. | |
| 2018/0102706 A1 | 4/2018 | Gao et al. | |
| 2019/0238083 A1 | 8/2019 | White et al. | |
| 2020/0119571 A1* | 4/2020 | Taylor, Jr. | H02M 3/155 |
| 2021/0126471 A1* | 4/2021 | Srivastava | H02J 7/0014 |
| 2023/0006572 A1* | 1/2023 | Rafsanjan | H02S 40/32 |

OTHER PUBLICATIONS

International Search Report and Written Opinion, USPTO, May 9, 2023, PCT application PCT/US23/11684.

* cited by examiner

*Primary Examiner* — Jerry D Robbins
(74) *Attorney, Agent, or Firm* — Invention To Patent Services; Alex Hobson

(57) ABSTRACT

An inverter and battery charger system that uses no power magnetic components to convert DC power supply from a plurality of batteries to AC power and achieves very high efficiency and small size. The inverter takes advantage of the different voltages in a series string of batteries to create small voltage steps to approximate a sinewave or other waveforms. By changing the timing where the voltage steps are selected, different frequencies can be obtained. The low frequency operation of the inverter produces little radio frequency interference. The battery charger applies charging current to the various nodes in the series string of battery cells to charge each one as needed to accommodate the differing levels of discharge used to make a sinewave or other waveform.

18 Claims, 3 Drawing Sheets

ULTRA-EFFICIENT BATTERY INTEGRATED INVERTER/CHARGER

CROSS REFERENCE TO RELATED APPLICATIONS

This application is a continuation of PCT/uS23/11684, filed on Jan. 27, 2023 and which claims the benefit of priority to U.S. provisional patent application No. 63/303,932, filed on Jan. 27, 2022; the entirety of each prior application is hereby incorporated by reference herein.

BACKGROUND OF THE INVENTION

Field of the Invention

The invention relates to a system for making alternating current from a plurality of battery cells connected in series and a means for charging those cells. The present embodiment of the invention accomplishes the direct current to alternating current conversion at near perfect efficiency without any power magnetic components, such as inductors or transformers.

Background

Historically, battery operated inverters have been large, bulky and inefficient mainly because they are designed to take as input, the voltage from a small number of battery cells in series. The inverters must accomplish both a voltage transformation and a conversion from direct current (DC) to alternating current (AC). This is typically done with large and heavy power magnetic components. Efficiency and cost are often traded off. Lower cost inverters are typically less efficient and more efficient inverters are typically more expensive. Efficiency is important because it increases the amount of time a given load can draw power from the battery. Losses in the inverter are also difficult to manage, often requiring heatsinks and fans to remove the resultant heat. These measures further increase the size, weight and cost of the inverter.

SUMMARY OF THE INVENTION

With the advent of small and powerful lithium battery cells, it is possible to construct very small batteries with a large number of cells in series. The number of cells in series is chosen to equal the peak voltage of the desired AC output. Nodes in the series string of these cells can be selected by the battery voltage selector switches in sequence to produce a waveform with small steps that closely approximate a half sine wave with low harmonic distortion. The resultant half sinewave is fed into a "H Bridge" which assembles it into a sinewave with positive polarity and negative polarity excursions. The selection circuitry and "H Bridge" can be made with semiconductor devices which results in near zero losses and lower cost, thereby eliminating the cost/efficiency tradeoff. While the present embodiment of the invention is not limited to any particular power level, the miniaturization of the circuitry possible lends itself to portable applications The battery cells that supply the lowest voltage in the series string supply the most power as they supply current for the longest time in the synthesis of the sine wave. The circuitry that selects the nodes via the bidirectional switches to be opened or closed for making the sinewave and thus discharging the cells can also be employed in the reverse direction to selectively charge the cells. This allows the cells to be charged based on how much each is discharged.

An exemplary inverter and battery charger system provides an AC output to electrical load and charges batteries from an AC power source, whereby the electrical load is powered by the batteries when an AC input is not plugged into the AC input or when the AC input is interrupted. The inverter comprises a plurality of bidirectional switches that connect to a plurality of series connected battery cells, by battery voltage selector switches (bidirectional switches) to produce a variable voltage output and a H bridge comprising at least four bidirectional switches that are configured to reverse the polarity of a signal from the plurality of battery voltage selector switches, to construct a sinewave with positive and negative excursions. The number of bidirectional switches in the H bridge may be chosen for a desired distortion level of a sinewave; more switches may produce a lower distortion. A relay is coupled with the AC input, the AC load output and the inverter, wherein the relay is configured to switch power supply from the AC power source, coupled to the AC input, to the inverter when the AC power source is interrupted, such as from a power grid power outage, or when the AC power source is unplugged from the AC input. If employed in a three-phase system then there would be six bidirectional switches, that may be configured in a three-phase bridge.

In an exemplary inverter and battery charger system, the relay couples the AC power source to the batteries to charge the batteries when the AC power source is coupled with the inverter and battery charger system. The battery charger may have a current limiting circuit, having an output that can be selectively applied to various nodes in a series string of a plurality of battery cells to charge the battery cells in different amounts, which may mean different voltage levels from a first battery of the plurality of battery cells to other batteries of the plurality of battery cells including a second battery of the plurality of battery cells. A second battery may be charged to a multiple of a charge level of a first battery in the plurality of battery cells by the inverter and battery charger system.

The inverter is a DC to AC inverter that uses no power magnetic components, or is a power magnetics free inverter. The inverter may have a plurality of battery voltage selector switches 121 to 132, wherein the controller, such as a microprocessor, is configured to change the timing of the battery voltage selector switches opening and closing, to alter the amplitude and wave shape of the sinewave output to regulate the output voltage to a desired level. The inverter is configured to produce a sinewave of a first and a second frequency by changing the timing of the sequencing of battery voltage selector switches. The inverter is configured to provide a set waveform by changing the timing and sequencing of the battery voltage selector switches. The inverter may be configured to operate at low frequency, such as 500 Hz or less, about 400 Hz or less, such as for aircraft applications, about 100 Hz or less, about 60 Hz or less, or about 50 Hz or less, and any range between and including the frequencies provide, and produces minimal radio frequency interference.

The inverter and battery charger system may be power magnetics free or not include any power magnetic components including power transformers and power inductors and may be referred to as a power magnetic-free inverter and battery charger system. The inverter and battery charger system does not require heavy power magnetic components and therefore may be small in size and light in weight. Magnetic components include but are not limited to transformers and inductors. The inverter and battery charger system may be small in size with a maximum dimension of no more than 10 cm and may have a weight of no more than 250 g. The inverter and battery charger system may have a maximum dimension of no more than 25 cm for a power output of at least 1000 W at 120V. The inverter and battery charger system may have a weight of no more than 454 g for a power output of 1000 W at 120V.

The inverter and battery charger system may include six bidirectional switches configured in a three-phase bridge. The inverter and battery charger system may include a plurality of battery cells, such as three or more, five or more, ten or more, twenty or more and any range between and including the number of batteries listed.

A bidirectional switch, as used herein, is a semiconductor device, such as two Mosfets connected in inverse series or other semiconductor devices similarly configured.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
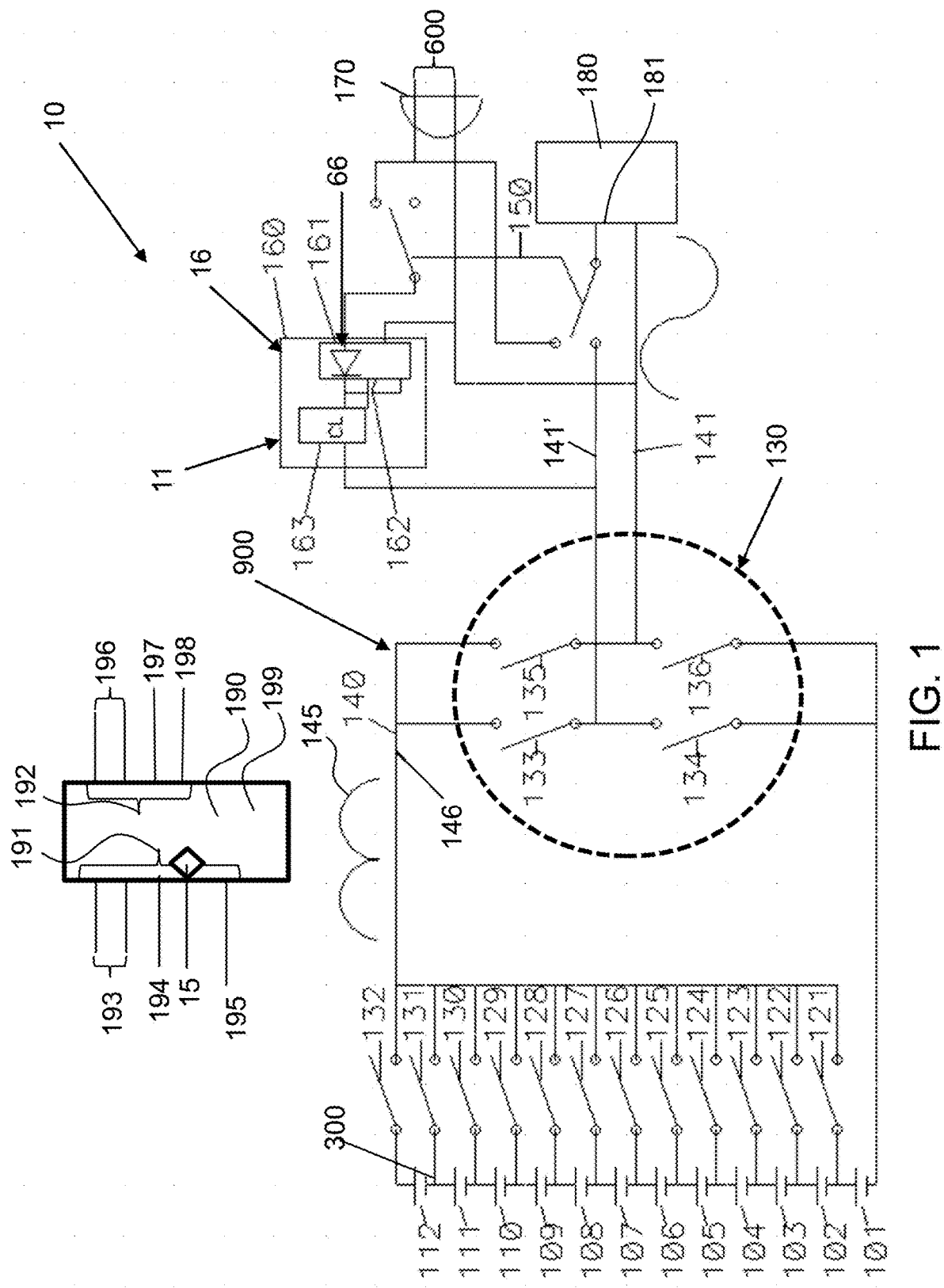
FIG. 1 shows a block diagram of a single phase inverter and charger system.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

In FIG. 1, an inverter and battery charger system 10 in used with a plurality of battery cells, 101, 102, 103, 104, 105, 106, 107, 108, 109, 110, 111 and 112, that are wired in series to create a voltage equal to the peak voltage of the desired AC output voltage. In the case of a 110V inverter 900, that voltage would be 154V. The inverter and battery charger system 10 utilizes an inverter 11 and battery charger 160 including a battery charging circuit 16 in an integrated manner to provide power to a load 180 and charge battery cells. The battery charger 160 has a battery charger input 66 coupled to the AC input 170 and AC power source 600. Under direction of microprocessor 190, or controller 199, the battery voltage selector switches (bidirectional switches), 121, 122, 123, 124, 125, 126, 127, 128, 129, 130, 131 and 132, turn on in sequence to create a stepped approximation of a half sinewave 145 that appears on the 154V bus 140, or half sinewave bus 146. The half sinewave is applied to the H bridge 130 consisting of bidirectional switches 133, 134, 135 and 136. To create the positive half of the sinewave, bidirectional switches 133 and 136 would be turned on under direction of the microprocessor 190. To create the negative half of the sinewave, bidirectional switches 135 and 134 would be turned by the microprocessor 190 or controller 199. The resulting sinewave from the H bridge is supplied to the load, 180, through a relay 150. The relay, 150, selects whether the load is connected to the AC power source 600 plugged into the AC power input 170, or the H bridge under control of the controller 199, such as a microprocessor 190. Electrical connection lines 141, 141' couple the AC input to the bidirectional switches of the H bridge. In this way, the load 180 can be continuously powered by the batteries 101 to 112, or the AC power source 600 plugged into the AC power input 170, if present. When the load, 180, is powered by the AC power input 170, the H bridge and the battery voltage selector switches (bidirectional switches) 121, 122, 123, 124, 125, 126, 127, 128, 129, 130, 131 and 132 connected to individual battery cells are available to charge the battery cells 101 to 112. A node 300 is a connection between the batteries, such as the connection between battery 111 to battery 112, battery 110 to battery 111, battery 109 to battery 110, battery 108 to battery 109, battery 107 to battery 108, battery 106 to battery 107, battery 105 to battery 106, battery 104 to battery 105, battery 103 to battery 104, battery 102 to battery 103, and between battery 101 to battery 102.

To charge the battery cells 101 to 112, the AC power source 600 must be present at the AC power input 170 to provide electrical power to the battery charger 160. An AC power input detector 15 is configured to detect power supply from the AC power source. The AC power input detector may be a circuit or a function of the microprocessor and may detect an AC power supply to the AC power input and also detect if the AC power supply is disconnected or interrupted. In this case, the relay 150, will connect a rectifier 161 to the AC power input 170. The output of the rectifier 161 is filtered by capacitor 162 and applied to the input of a current limiter 163. The current limiter assures that the charging current is kept to an amount appropriate for the battery cells used. The output of the current limiter 163, is applied to the H bridge 130 where bidirectional switches 133 and 136 are constantly on. The bus 140 that was the half sinewave output in inverter mode is now the current limiter output in charging mode. This output will be connected to the battery cells 101 to 112 in sequence starting at 112 until each battery cell is charged. The charging current will flow through the selected battery cell through all the cells below it in the series string. The voltage on the current limiter output 140 will be limited to the selected voltage by the sum of the battery voltages series connected to the selected node in the series string. Once the selected battery cell reaches the appropriate voltage and current, the next battery cell will be selected. The batteries positioned lower in the series string will be used more heavily and will therefore require more charge. By charging starting with the first battery in the series string of batteries and going to the last battery in the series string of batteries, all of the batteries can be charged to an appropriate level.

As shown in FIG. 1, an AC power source 600, which is typically 110V AC input but may be some other power source input voltage, is plugged into the AC power input 170. Also, the AC load output 181 is connected with a load 180 that may be a 110V, AC load.

The controller 199 may include a microprocessor 190, and a plurality of inputs 191 including battery voltage input 193, an AC input 194, and a battery current input 195 and the AC power input detector 15. The controller may also have a plurality of outputs including selector switch output 196, a H bridge output 197 and a relay output 198.

Figure 2:
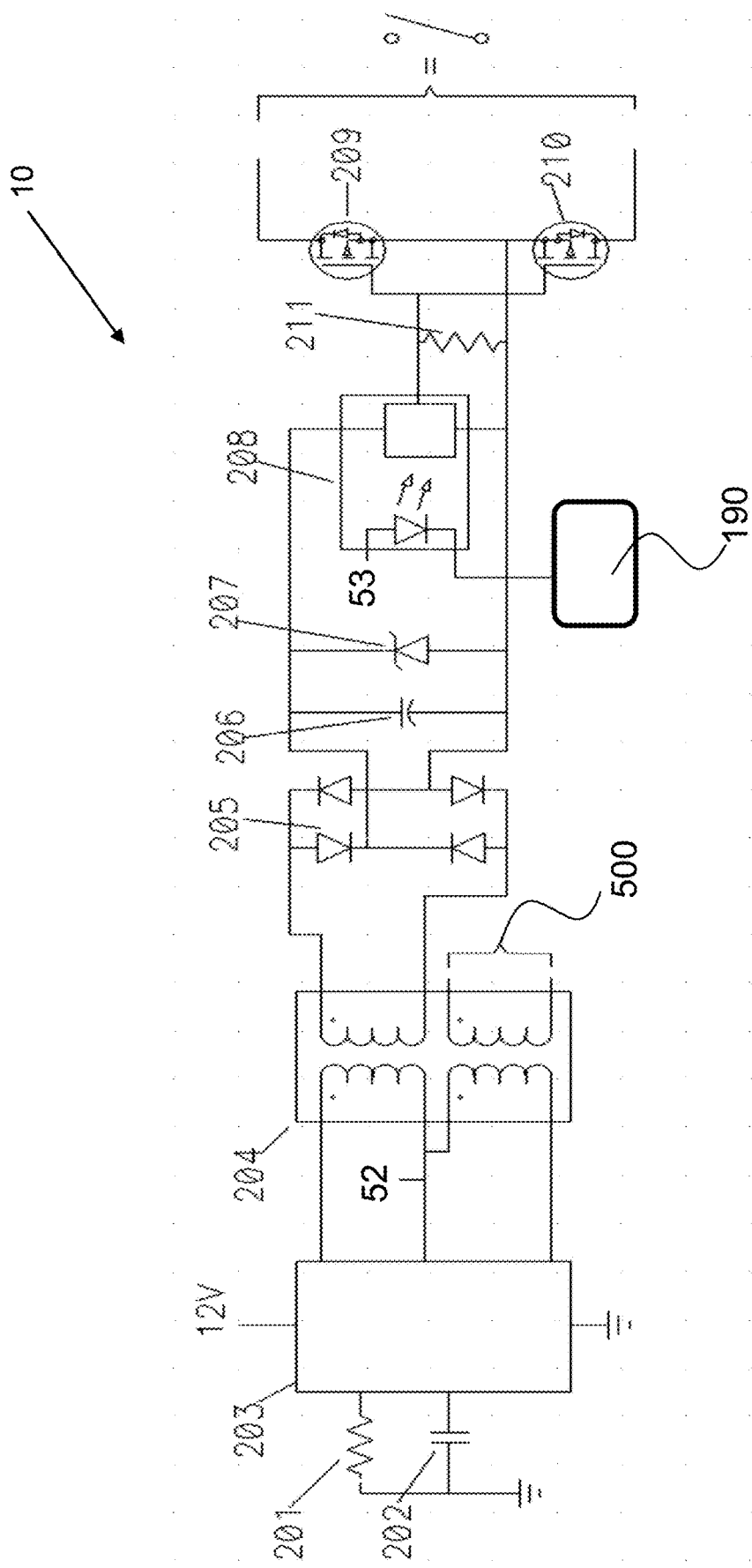
FIG. 2 shows a diagram of a bidirectional MOSFET switch as used in the battery tap selector and "H bridge" of the inverter system of FIG. 1.

In FIG. 2, the inverter and battery charger system 10 utilizes MOSFETs 209 and 210 that are connected in inverse series as to form a bidirectional switch. MOSFETs are inherently bidirectional but the parasitic body diode of the MOSFET only allows it to control current flow in one direction. In the other direction, current will flow through the body diode without restriction. The gate of the MOSFETs are driven by an optically isolated driver circuit 208, which is turn controlled by microprocessor 190. The connection 500 to a second circuit is shown in FIG. 2.

The power to operate the driver circuit and MOSFETs comes from the isolated power supply consisting of components shown, resistor 201, capacitor 202, IC 203, micropower transformers 204, diodes 205, capacitor 206 and Zener diode 207. The Integrated Circuit 203 is a typical switching power supply controller with two outputs that would be used in a push-pull circuit. It provides a high frequency output to drive transformer 204. The operating frequency of the IC 203 is determined by the resistor, 201 and the capacitor 202. The IC 203 will drive 6 of the transformers 204 in the preferred embodiment. Each of the transformers, 204, has 2 isolated secondaries which can power 2 bidirectional switches. Each of the secondaries provides a high frequency AC signal that is rectified by the diodes 205, filtered by capacitor 206 and limited to a safe level by Zener diode 207. As shown in FIG. 2, the driver circuit includes a resistor 211. As shown in FIG. 2, there are voltages of the inverter and battery charger system 10, such as a 12V potential 52 and a 3.3V potential 53.

Figure 3:
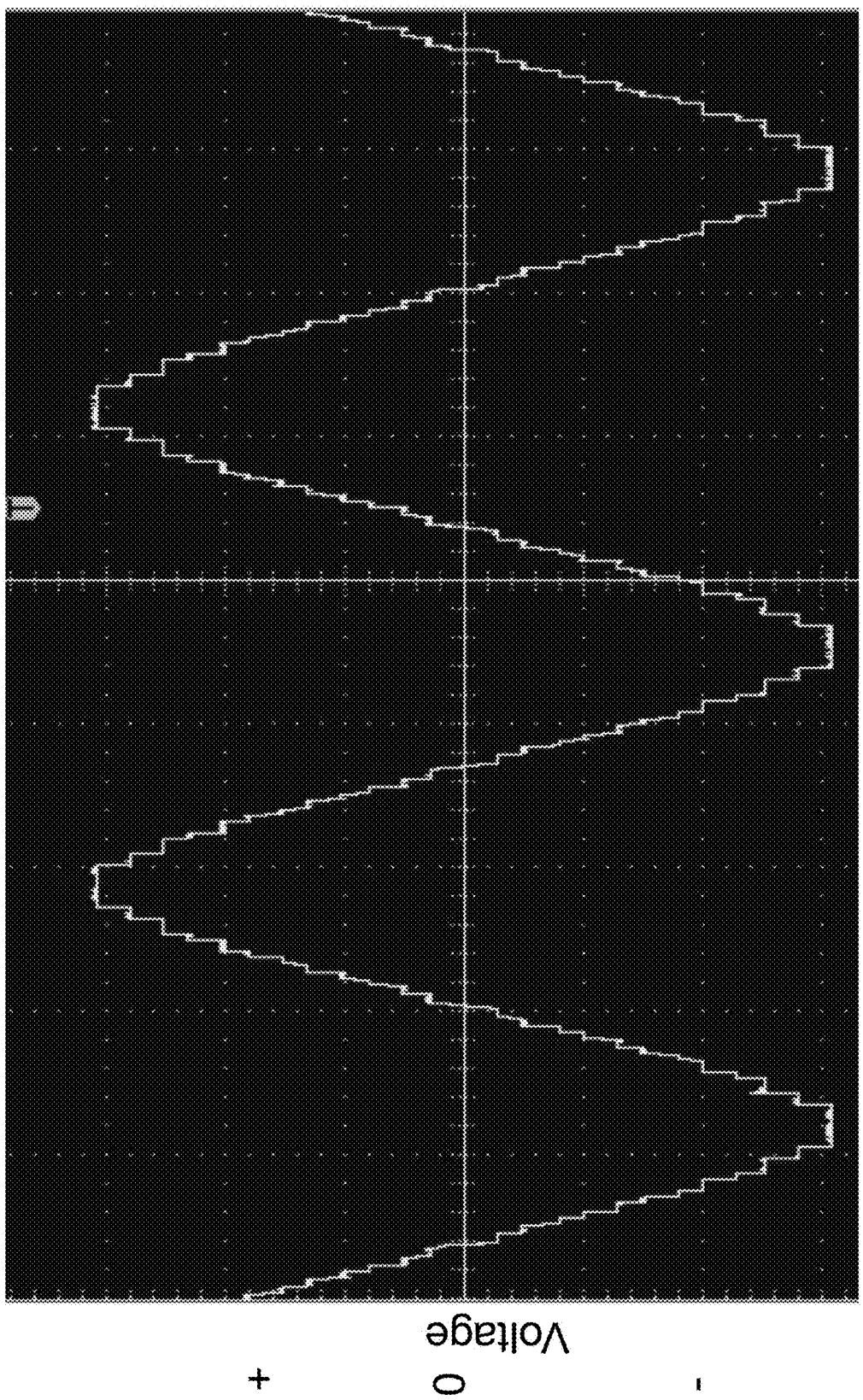
FIG. 3 shows the resultant output waveform from the preferred embodiment of the inverter.

FIG. 3 is a screen shot from an oscilloscope showing the resultant sinewave from the inverter. The approximated sinewave has positive voltage amplitude portions with a voltage greater than zero and negative voltage amplitude portions with a voltage less than zero, or negative and a frequency of 60 Hz. Note the discrete steps in the approximated sinewave that are each a connection to the plurality of battery cells through a specific combination of battery voltage selector switches.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. An inverter and battery charger system that provides an AC load output and charges a plurality of battery cells from an AC power source, said system comprising:
   a) a controller;
   b) an inverter;
   c) said plurality of battery cells, wherein each battery of the plurality of battery cells has a battery voltage selector switch; said plurality of battery cells connected in series and having a node between adjacent battery cells of the plurality of battery cells;
   d) a battery charger for charging said plurality of battery cells;
   e) a plurality of battery cell bidirectional switches that connect in parallel to said plurality battery cells to produce a variable voltage output from the plurality of battery cells;
   wherein said plurality of battery cell bidirectional switches are configured to connect to an H Bridge that reverses the polarity of a signal from the plurality of battery cells to construct a sinewave with positive and negative amplitude;
   f) an AC input for connecting said AC power source that provides an AC power supply to the inverter and battery charger system;
   g) an AC power input detector that detects said AC power supply to the AC power input;
   h) said AC load output configured to couple with a load;
   i) a relay coupled with said AC power input, said AC load output and said inverter,
   j) a battery charging circuit configured between the AC input and the plurality of battery cells;
   k) said H bridge configured between the plurality of batteries and the AC output and comprising at least four bidirectional switches, and wherein the controller assembles a half sinewave into a complete sinewave with the H bridge with the resulting waveform having positive and negative amplitudes;
   wherein the relay is configured to switch said load from the AC power input to the inverter;
   wherein the controller automatically controls the relay to connect the load to the AC power input when the AC power input detector detects said AC power supply to the AC power input;
   wherein said relay connects the load to the inverter when the AC power input detector does not detect said AC power supply to the AC power input;
   wherein said relay connects the battery charging circuit to an AC power input when the AC power input detector detects said AC power supply to the AC power input; and
   wherein the controller controls and sequences operations of said inverter and battery charger system;
   wherein the inverter is a DC to AC inverter that uses no power magnetic component;

wherein each of the plurality of battery cells is connected to the H bridge one at a time by one of the plurality of battery cell bidirectional switches.

2. The inverter and battery charger system of claim 1, wherein the battery voltage selector switches sequence connection to the plurality of battery cells to produce a variable voltage output to form a half sine wave.

3. The inverter and battery charger system of claim 2, comprising four bidirectional switches configured in an H bridge.

4. The inverter and battery charger system of claim 1, wherein the battery charger has a battery charger input that is coupled to said relay.

5. The inverter and battery charger system of claim 4, wherein the battery charger has a current limiter, having an output that can be selectively applied to one or more of the nodes of the plurality of battery cells to charge a first battery cell to a different voltage level than a second battery cell of the plurality of battery cells.

6. The inverter and battery charger system of claim 1, wherein the controller is configured to change the timing of the opening and closing of the battery voltage selector switches to alter an amplitude and wave shape of the sinewave to regulate an output voltage to a set voltage level set by the controller.

7. The inverter and battery charger system of claim 1, configured to produce said sinewave having a first frequency and a second frequency by changing the timing of the sequencing of the battery voltage selector switches.

8. The inverter and battery charger system of claim 1, configured to produce a set waveform by changing the timing and sequencing of the battery voltage selector switches.

9. The inverter and battery charger system of claim 1, that operates at low frequency of less 500 Hz and produces low radio frequency interference.

10. The inverter and battery charger system of claim 1, that operates at low frequency of less 100 Hz and produces low radio frequency interference.

11. The inverter and battery charger system of claim 1, having a maximum dimension of no more than 25 cm for a power output of at least 1000 W at 120V.

12. The inverter and battery charger system of claim 11, having a weight of no more than 454 g for a power output of 1000 W at 120V.

13. The inverter and battery charger system of claim 1, having a weight of no more than 454 g for a power output of 1000 W at 120V.

14. The inverter and battery charger system of claim 1, having no power magnetic components.

15. The inverter and battery charger system of claim 1, having no transformers.

16. The inverter and battery charger system of claim 15, having no inductors.

17. The inverter and battery charger system of claim 1, having no inductors.

18. The inverter and battery charger system of claim 1, wherein the controller comprises a microprocessor.

* * * * *